United States Patent
Petrovic et al.

(10) Patent No.: US 6,294,068 B1
(45) Date of Patent: Sep. 25, 2001

(54) ELECTROCHEMICAL CONVERSION OF HYDROCARBONS

(75) Inventors: Slobodan Petrovic, Scottsdale, AZ (US); John C. Donini, deceased, late of Vancouver (CA), by Oreola Donini, legal representative; Surjit Singh Thind, Edmonton (CA); Shimin Tong, Calgary (CA); Alan Rodney Sanger, Edmonton (CA)

(73) Assignee: Natural Resources Canada, Ottawa (CA)

(*) Notice: Subject to any disclaimer, the term of this patent is extended or adjusted under 35 U.S.C. 154(b) by 0 days.

(21) Appl. No.: 09/543,665

(22) Filed: Apr. 7, 2000

Related U.S. Application Data

(63) Continuation-in-part of application No. 09/099,033, filed on Jun. 18, 1998, now abandoned.
(60) Provisional application No. 60/050,382, filed on Jun. 20, 1997.

(51) Int. Cl.[7] ................................................ C25B 3/00
(52) U.S. Cl. ........................................ 205/414; 205/462
(58) Field of Search ................................ 205/414, 462

(56) References Cited

U.S. PATENT DOCUMENTS 5,051,156 * 9/1991 Scharifker et al. .................... 204/80
5,064,733 * 11/1991 Krist et al. ............................ 429/17
5,976,721 * 11/1999 Limaye .................................. 429/13

OTHER PUBLICATIONS

Hamakawa et al., "Electrochemical Methane Coupling Using Protonic Conductors", J. Electrochem. Soc., vol. 140, No. 2, pp. 459–462. Feb. 1993.*

* cited by examiner

*Primary Examiner*—Edna Wong

(57) ABSTRACT

A process and apparatus are described for producing higher hydrocarbons from lower hydrocarbons, e.g. by gas phase electrocatalytic polymerization of methane. This is done using an electrolysis cell having an anode chamber on one side of a solid electrolyte and a cathode chamber on the other side of the solid electrolyte. According to this process, methane-containing gas is passed through the anode chamber to contact a catalytic anode which is connected to one side of the solid electrolyte, this solid electrolyte comprising a solid proton conducting membrane. An inert gas or oxygen is passed through the cathode chamber to contact a catalytic cathode which is connected to the other side of the proton conducting membrane. The membrane is designed so that $H^+$ is capable of passing through the membrane from the anode chamber to the cathode chamber.

12 Claims, 4 Drawing Sheets

ELECTROCHEMICAL CONVERSION OF HYDROCARBONS

CROSS REFERENCE TO RELATED APPLICATION

This application claims the benefit of U.S. Provisional patent application No. 60/050,382, filed Jun. 20, 1997 and is a continuation-in-part of U.S. patent application Ser. No. 09/099,033, filed Jun. 18, 1998 now abandoned.

BACKGROUND OF THE INVENTION

This invention relates to a process for producing C-2 and higher hydrocarbons from lower hydrocarbons, and particularly, direct gas phase electrocatalytic polymerization of lower hydrocarbons, such as methane, to produce higher hydrocarbons, e.g. ethane and gasoline range hydrocarbons.

There remains an interest in the energy industry to produce gasoline range hydrocarbons from natural gas or methane. A series of patents for this purpose where granted to George Olah, i.e. U.S. Pat. Nos. 4,433,192, 4,513,164, 4,465,893 and 4,467,130.

Krist et al. U.S. Pat. No. 5,064,733 describes the electrochemical conversion of $CO_2$ and $CH_4$ to C-2 hydrocarbons using a single electrochemical cell. This was accomplished by means of a cell divided by way of a solid electrolyte with methane-containing gas being introduced into one side of the cell and carbon dioxide into the other side of the cell. The process of that patent is primarily concerned with proton conductors used to dimerize methane. The process is operated at quite high temperatures in the order of 600 to 1000 °C. and no $H_2$ can be produced.

Another process for electrochemically converting methane to $C_2$ hydrocarbons is described in Hamakawa et al. "Electrochemical Methane Coupling Using Protonic Conductors", J. Electrochem. Soc., Vol. 140, No. 2, February 1993, pp 459–462. This describes the low-level coupling of methane in a cell that includes an electrochemical hydrogen pump. This cell necessarily uses a high temperature proton conductor, $SrCe_{0.95}Yb_{0.05}O_3$, as a solid electrolyte, operating at 1173K (900° C.). With this system the evolution of hydrogen and current density were both low. Under an applied potential, the current density was only 1% to fuel conversion and the conversion of $CH_4$ to high hydrocarbons was less than 1%.

It is the object of the present invention to polymerize and dimerize lower hydrocarbons in order to produce higher hydrocarbons, including unsaturated hydrocarbons.

SUMMARY OF THE INVENTION

One embodiment of this invention comprises a process for gas phase electrocatalytic polymerization of methane, ethane or methanol to produce higher hydrocarbons and hydrogen. This is done using an electrolysis cell having an anode chamber on one side of a solid electrolyte and a cathode chamber on the other of the solid electrolyte. According to this process, methane-, ethane- or methanol-containing gas is passed through the anode chamber to contact a catalytic anode which is connected to one side of the solid electrolyte, this solid electrolyte comprising a solid proton conducting membrane. An inert gas or oxygen is passed through the cathode chamber to contact a catalytic cathode which is connected to the other side of the proton conducting membrane. The membrane is designed so that $H^+$ is capable of passing through the membrane from the anode chamber to the cathode chamber. As a consequence, when methane is used as feedstock C-2 and higher hydrocarbons are formed in the anode chamber and hydrogen or water is formed in the cathode chamber.

A further embodiment of this invention is an electrochemical cell for gas phase electrocatalytic polymerization of methane, ethane or methanol to produce higher hydrocarbons and hydrogen. This cell comprises an anode chamber on one side of the solid electrolyte and a cathode chamber on the other side of the electrolyte. The solid electrolyte comprises a solid proton conducting membrane separating the anode chamber from the cathode chamber. A catalytic anode is connected to one side of the proton conducting membrane and a cathode is connected to the other side of the membrane. Means are provided for passing methane, ethane or methanol in contact with the catalytic anode and means are also provided for passing an inert gas or oxygen in contact with the cathode. Finally, means are included for withdrawing higher hydrocarbons from the anode chamber and for withdrawing hydrogen or water from the cathode chamber.

The membrane capable of transferring the $H^+$ from the anode chamber to the cathode chamber may be made from a variety of materials, e.g. perfluorosulfonic acid or polybenzimidazole. Perfluorosulfonic acid polymer is available under the trademark NAFION. The anode and cathode may also be formed from a variety of different materials, such as compressed carbon powder loaded with metal catalyst, carbon cloths supporting metal catalyst, nickel mesh impregnated with metal catalyst, etc. Among particularly useful catalysts, there may be mentioned noble metals, such as Pt, Pd, Ru, etc. The body of the electrolysis cell may also be formed from a variety of materials such as TEFLON™, a carbon block, metal, etc., with metal being preferred.

By forming the membrane from polybenzimidazole or perfluorosulfonic acid, the invention has the important advantage of providing excellent conversion of methane to electrical energy and higher hydrocarbons at quite moderate temperatures of less than 300° C. Thus, the electrochemical conversion is typically conducted at temperatures in the range of about 60 to 300° C., preferably about 65 to 225° C. When an untreated perfluorosulfonic acid polymer is used as membrane, the conversion must be conducted at a temperature below 120° C. In this case a methane activation catalyst is also required for the methane coupling reaction. When the perfluorosulfonic acid polymer membrane is treated with phosphoric acid, the working temperature can be increased to as high as 210° C., preferably about 180 to 210° C. The polybenzimidazole membrane (PBI) when treated with phosphoric acid can be operated at temperatures up to 300° C., preferably about 60 to 300° C. For the polybenzimidazole, a more preferred temperature is in the range of about 130 to 225° C., with a range of about 180 to 225° C. being particularly preferred.

BRIEF DESCRIPTION OF THE DRAWINGS

The above and further advantages of this invention will be seen in reading of the description of the preferred embodiments together with reference to the drawings wherein.

DESCRIPTION OF THE PREFERRED EMBODIMENTS

Figure 1:
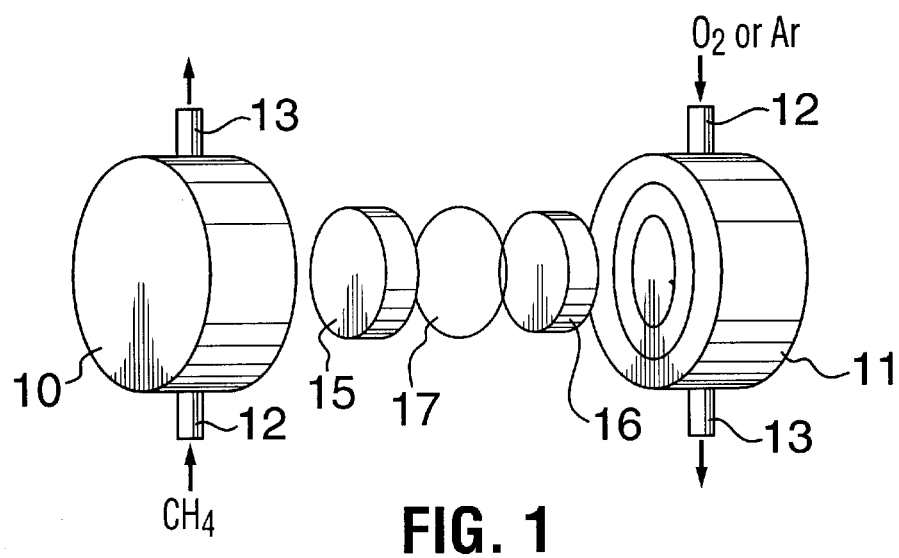
FIG. 1 is a schematic representation of a TEFLON™ electrolysis cell according to the invention.

FIG. 1 shows a Teflon electrolysis cell having Teflon body portions 10 and 11, each with a flow inlet connector 12 and a flow outlet connector 13. Each body portion also has a body cavity connected to the flow connectors 12 and 13.

Electrodes 15 and 16 fit within recesses in the body cavities with membrane 17 held between the electrodes 15 and 16.

Figure 2:
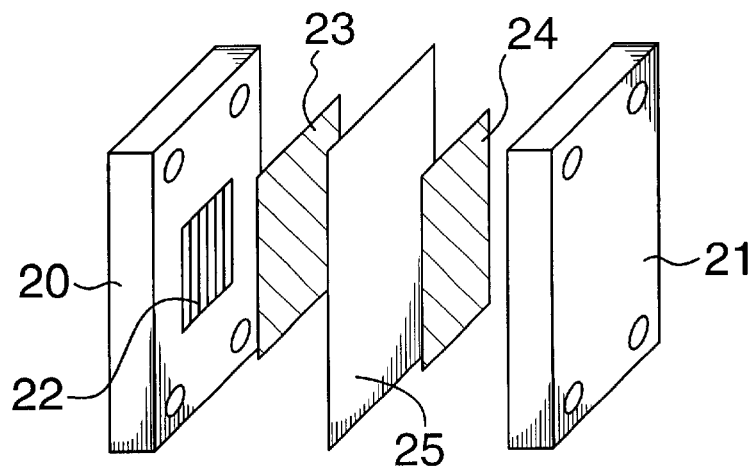
FIG. 2 is a schematic representation of a carbon block electrolysis cell.

A carbon block electrolysis cell is shown in FIG. 2. In this embodiment, a pair of carbon blocks 20 and 21 are used to form the body of the electrolysis cell. Slots 22 are provided in the carbon blocks to provide flow to the electrodes 23 and 24 which are held between the blocks 20 and 21. A membrane 25 is held between the electrodes 23 and 24 to complete the cell.

Figure 3:
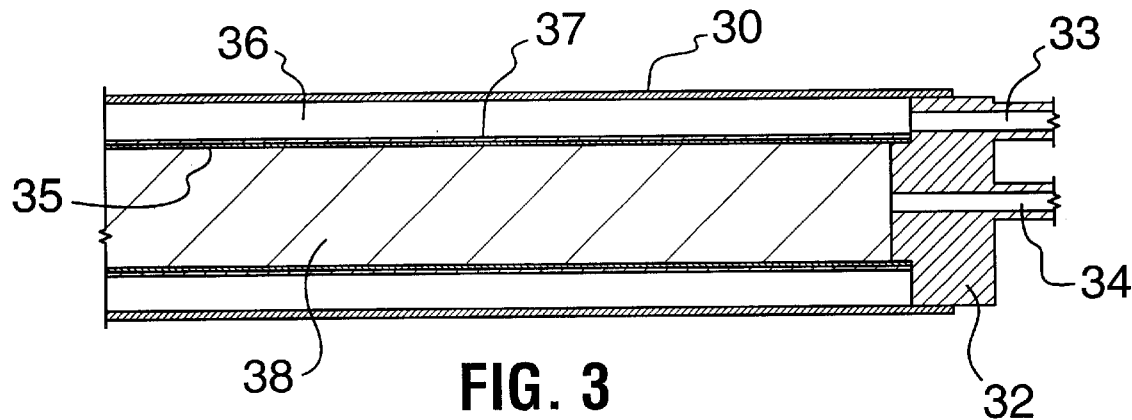
FIG. 3 is a schematic representation of a high pressure, high temperature stainless steel electrolysis cell.

A high temperature, high pressure (HPHT) stainless steel cell is shown in FIG. 3. This consists of an outer tubular steel body 30 having ceramic end inserts 32 to provide flow connectors 33 and 34 which are insulated from the steel tube 30. The ceramic inserts 32 are held in place by end compression nuts, not shown.

Mounted within steel tube 30 is a porous nickel tube 35 of smaller diameter than steel tube 30 so as to provide an annular space 36 between porous nickel tube 35 and steel tube 30. A layer comprising a polybenzimidazole (PBI) membrane is formed on the outside surface of the nickel tube 35, sealing the pores of the tube. A nickel mesh 37 is wrapped around the tube 35, this mesh supporting a metal catalyst. The mesh is tightly wrapped onto the tube using a nickel wire 38 which also acts as the electrical contact.

In the test work carried out to evaluate the present invention, the following instrumentation and gas analyses were used.

Instrumentation

The electrochemical data were recorded using a SOLARTRON™ 1286 electrochemical interface managed by CORRWARE™ software. Cyclic voltammetry and linear sweep voltammetry were used to monitor any changes while constant potential and constant current modes were used to perform gas phase electrolysis.

Gas Analysis

The gas phase reaction feed and product from the cell were analyzed using gas chromatography (VARIAN VISTA™ 6000 CX, CDS 401 Computer Data System). The gas chromatograph was equipped with a 50/80 PORAPAK™ N column (Sulpeco) through which all components in the gas phase were eluted. The lighter components (such as $H_2$, $N_2$, $O_2$ and $CH_4$) were then passed through a molecular sieve 13x (Sulpeco) for separation and detected by a thermal conductivity detector (TCD). The heavier components (such as CO, $CO_2$, $C_2H_4$, $C_2H_6$, and $C_2H_2$) passed through a methanizer to convert them to methane, and were subsequently detected by a flame ionization detector (FID). Argon served as a carrier gas for this gas chromatography system. The standard sample injection volume was approximately 1 μL. The column temperature was programmed from 65° C., constant for 10 min., to 130° C. at a rate of 5° C./min. Then the temperature was kept constant at 130° C. until the completion of the analysis. The instrument was calibrated using a UHP external calibration standard gas tank (Matheson Gas Products). Component peak detection was automatically performed by the CDS. The gas effluent from the cell was on-line analyzed every one hour and three samples were taken for each operation condition.

Catalyst Preparation a) Carbon Supported Metal Catalyst

A measured amount of $H_2PtCl_6$, palladium chloride ($PdCl_2$) or ruthenium chloride ($RuCl_3$) (Aldrich) was dissolved in 200 mL deionized water. The solution was heated at lukewarm temperature to completely dissolve the chemical in the water. Then a measured amount of carbon powder was added into the solution. The amount of carbon added was calculated to provide a metal loading of 10% by weight. The resulting solution was vigorously stirred and heated in air at 80° C. until dry. The dried carbon powder loaded with metal catalyst was then baked in an oven under a small stream of hydrogen. The oven temperature was programmed for heating at a rate of 2° C./min. from room temperature to 300° C. The temperature was kept constant at 300° C. for four hours.

For hydrophobic treatment of the catalyst, a measured amount of FEP emulsion (ElectroChem, Inc.) with a drop of TRITON-X-100™ (Fisher Scientific) was added into the carbon water solution before the drying process.

b) Nickel Mesh Supported Catalyst

The metal chemical-water solution was first prepared in the same way as above. Then a desired size of the nickel mesh (matching the cell size) was submersed in the solution. An overnight impregnation was allowed. The nickel mesh impregnated with metal catalyst (Pt, Pd or Ru) was taken out of the solution and dried at 80° C. for 30 min. Then it was baked in an oven at 300° C. for four hours in a hydrogen atmosphere. The baking procedure was same as for the carbon based catalyst.

Preparation of Catalytic Electrode

The method of preparation of the catalytic electrode varied according to membrane and cell being used.

a) Electrode Using Nafion Membrane

An approximately 1 gram sample of powder carbon-metal catalyst was pressed into a pellet under a pressure of 500 lb in a die. The pellet size and shape was made to fit to the size of the cell. The pellet was then coated with perfluorosulfonic acid (NAFION) solution to ensure adhesion to the NAFION membrane (purchased from Du Pont). The NAFION membrane was sandwiched between two pellets as shown in FIG. 1. The prepared NAFION membrane-carbon catalyst pellet was baked in an oven for 20 minutes at 120° C. before use.

b) Electrode Using Phosphoric Acid Treated NAFION Membrane

A piece of 2×2 inch NAFION membrane, which conforms to the size of a carbon block cell, was completely submersed in an 85% phosphoric acid solution and boiled for at least 4 hours. Then the membrane was taken out of the solution and left to dry to incipient wetness. Carbon metal catalyst, prepared as described above, was loaded onto a carbon cloth (purchased from Du Pont). The metal catalyst precursor was dissolved in an ethanol solution in a glass bottle. Then the carbon cloth was placed in the solution. The glass bottle was mounted onto a horizontal motor turning at a slow speed of about 5 rpm. While turning, an infra-lamp was used to heat the glass bottle until all the ethanol solvent in the bottle evaporated. By this method, the carbon supported metal catalyst was deposited onto the carbon cloth. Two pieces of catalyst loaded carbon cloth, together with the phosphoric acid treated membrane, were sandwiched in a carbon block cell as shown in FIG. 2.

c) Electrode Using PBI Membrane

Poly[2,2'-(m-phenylene)-5,5'-dibenzimidazole] (PBI) was obtained in powder form from Hoechst-Celanese. The polymer was dissolved in a dimethylacetamide solution (Aldrich) and 1 wt % LiCl was added as a stabilizing agent. The solution was heated at 130° C. with reflux under atmospheric pressure for at least 2 hours. After cooling down to ambient temperature, the solution was used to coat the external surface of a porous nickel tube. A layer of PBI membrane was formed on the outside surface of the nickel tube, sealing the pores of the tube. The tube was pressure tested for seal. The PBI membrane-nickel tube was submersed in a phosphoric acid solution (85% concentration) overnight. Then it was ready to load catalyst.

For loading a carbon supported metal catalyst, the catalyst was dissolved in a water-cellulose solution, forming a black paste. The paste was coated on the nickel tube with PBI membrane on the surface. The tube, after being coated with the carbon catalyst paste, was left to dry at ambient temperature. For the nickel mesh supported metal catalyst, the metal mesh was tightly wrapped onto the tube using a nickel wire, as shown in FIG. 3.

Testing Method a) Electrolysis Mode

The channels were purged by nitrogen or argon gas. Then methane gas was introduced into the cathode side to replace the nitrogen/argon gas. After the electrical cell reached a constant operation temperature, a potential was applied to the cell. The current along the cell, with constant potential applied, was monitored and recorded by CORRWARE™ computer software from Scribner Associates Inc. The composition of the effluent was analyzed by an on-line gas chromatograph.

b) Fuel Cell Mode

Both the anode and cathode channels of the cell were first purged by nitrogen or argon gas. Under an inert gas atmosphere, the cell was heated to a desired operation temperature at a controlled rate of 1–2° C./min. At the same time, the potential output of the cell was monitored by a Solartron 1286 instrument. After steady state was established at the operation condition, oxygen gas was introduced to replace the nitrogen gas in the cathode side and a reducing gas, such as $H_2$, $CH_3OH$, $C_2H_6$ or $CH_4$ was introduced to the anode side. The potential output as a function of time was recorded using CORRWARE software.

EXAMPLE 1

In order to test the effect of the gas mode, both the anode and cathode channels of an electrolytic cell according to the invention were filled with flowing oxygen gas.

Figure 4:
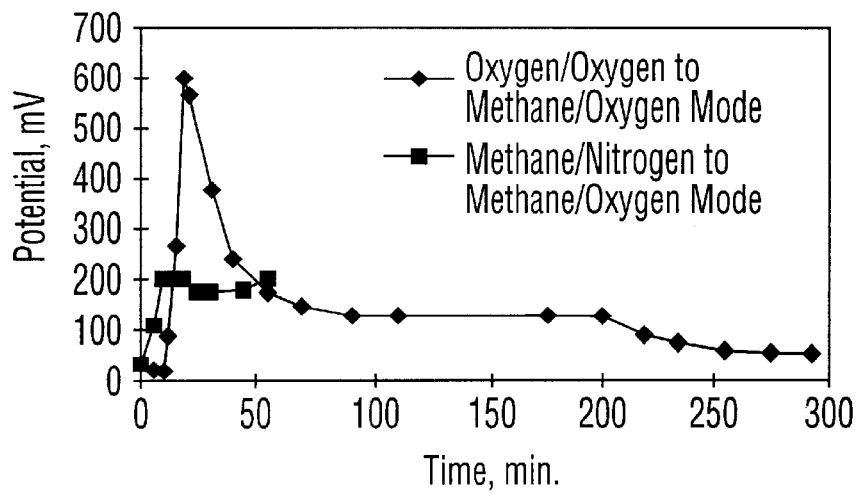
FIG. 4 is a plot of potential v. time.

After a steady-state potential base line was established, the anode side of the oxygen gas was replaced by a pure methane gas. The change of the potential was monitored. FIG. 4 presents the testing as conducted with a Teflon cell as shown in FIG. 1 loaded with a NAFION membrane/Carbon-Pt electrode. The testing was conducted at 80° C. and atmospheric pressure. When the gas phase was shifted from $O_2/O_2$ to $CH_4/O_2$ mode, a temporary high potential peak (~600 mV) appeared. With time, the potential value dropped to around 150 mV at 100 min. and continued to drop with time. The temporary high potential peak was checked by running a different gas shifting mode. The methane (anode)/argon (cathode) mode was operated first. Then the argon gas was replaced by oxygen gas. With this mode, the temporary high peak disappeared. This experimental fact indicated that when gas shifted from $O_2/O_2$ to $CH_4/O_2$ as cited above, the $O_2$ and $CH_4$ gases may meet and react in the anode side of the cell in the transition stage.

The methane may also react with preadsorbed oxygen on the catalytic electrode surface and thereby produce a high potential peak. With the second operation mode, the possibility of direct reaction between methane and oxygen was avoided. Hence the temporary high potential peak was eliminated. It is believed that the catalytic electrode might be active for a methane oxidation reaction but not favorable for methane activation in the absence of oxygen. In the gas chromatograph analysis of the effluent gas from the methane side, low ppm levels of ethylene or ethane were detected. Unwanted ppm levels of $CO_2$ product also appeared with the process.

EXAMPLE 2

To search for a possible condition under which the methane can be activated, selected metal catalysts (e.g., Pt, 5 Ru and Ta) were tested in a range of temperatures within thermally stable limits of the NAFION membrane. Table 1 shows the tested catalytic electrodes and temperature ranges.

TABLE 1

Catalytic Electrochemical Cells Using Nafion Membrane

| Type of Cell | Anode | Cathode | Temperature ° C. |
|---|---|---|---|
| Teflon | Pt-VULCAN Carbon on Stainless Steel Mesh | Pt-VULCAN Carbon on Stainless Steel Mesh | 90–120 |
| Teflon | Ru-VULCAN Carbon on Stainless Steel Mesh | Pt-VULCAN Carbon on Stainless Steel Mesh | 90–120 |
| Carbon Block | Pt-Activated Carbon on Carbon Cloth | Pt-Activated Carbon on Carbon Cloth | 70–90 |
| Carbon Block | Pt-VULCAN Carbon on Carbon Cloth | Pt-VULCAN Carbon on Carbon Cloth | 70–90 |
| Carbon Block | Ta-Activated Carbon on Carbon Cloth | Pt-Activated Carbon on Carbon Cloth | 90 |
| Carbon Block | Ru-VULCAN Carbon on Carbon Cloth | Pt-Activated Carbon on Carbon Cloth | 90 |

Figure 5:
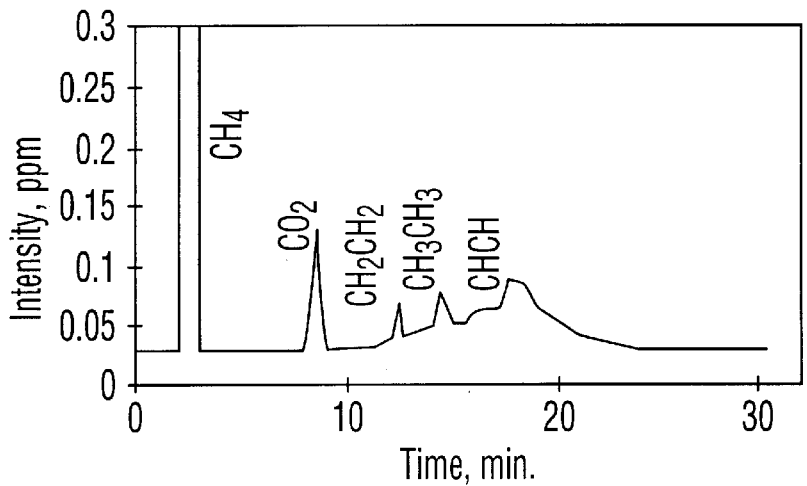
FIG. 5 is a typical gas chromatography analysis.

In the test, a $CH_4/N_2$ operational mode was used. At each test temperature, a potential from 0.5 to 4 volts was applied. Some activity was usually present at 0.8 volt and easily measurable activity was always present at 1 volt. The effluent gas composition on the methane side was on-line analyzed by gas chromatography. Only ppm level of C-2 products (ethane and/or ethylene) was detected. A typical gas chromatograph analysis is presented in FIG. 5.

For the methane fuel cell, a general reaction step can be suggested as follows:

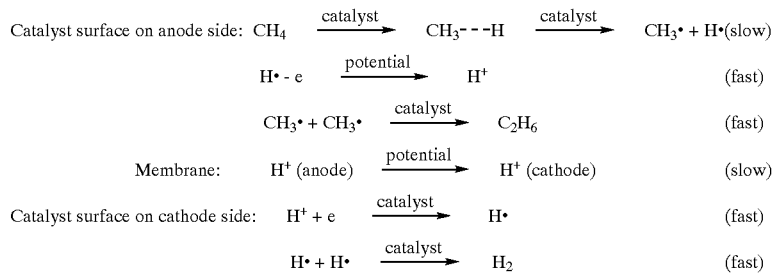

Catalyst surface on anode side: $CH_4 \xrightarrow{catalyst} CH_3\text{-}\text{-}\text{-}H \xrightarrow{catalyst} CH_3\bullet + H\bullet$ (slow)

$H\bullet - e \xrightarrow{potential} H^+$ (fast)

$CH_3\bullet + CH_3\bullet \xrightarrow{catalyst} C_2H_6$ (fast)

Membrane: $H^+$ (anode) $\xrightarrow{potential} H^+$ (cathode) (slow)

Catalyst surface on cathode side: $H^+ + e \xrightarrow{catalyst} H\bullet$ (fast)

$H\bullet + H\bullet \xrightarrow{catalyst} H_2$ (fast)

The reaction rate depends on the catalyst activity able to split the methane and the proton conducting efficiency through the membrane. A possible explanation for the low concentration of C-2 hydrocarbons could be attributed to either an ineffective protonic membrane or an inactive catalyst surface.

When $C_2H_6$ is used as feedstock, the above reactions change as follows:

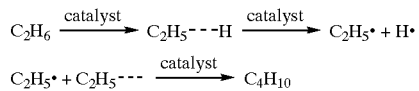

$C_2H_6 \xrightarrow{catalyst} C_2H_5\text{-}\text{-}\text{-}H \xrightarrow{catalyst} C_2H_5\bullet + H\bullet$ $C_2H_5\bullet + C_2H_5\text{-}\text{-}\text{-} \xrightarrow{catalyst} C_4H_{10}$

EXAMPLE 3

The thermal stability of the NAFION membrane may be increased up to 210° C. after being treated with phosphoric acid. This increase provides the flexibility of operating the cell at a higher temperature. The $CH_4/O_2$ fuel cell mode was conducted at 180° C. to test this membrane. Table 2 shows the test conditions and the electrode compositions.

TABLE 2

Catalytic Electrochemical Cells Using Phosphoric Acid Treated Nation Membrane

| Type of Cell | Anode | Cathode | Temperature ° C. |
|---|---|---|---|
| Carbon Block | Pt-Activated Carbon/Carbon Cloth | Pt-Activated Carbon/Carbon Cloth | 180 |
| Carbon Block | Ru-Activated Carbon/Carbon Cloth | Pt-Activated Carbon/Carbon Cloth | 180 |

Figure 6:
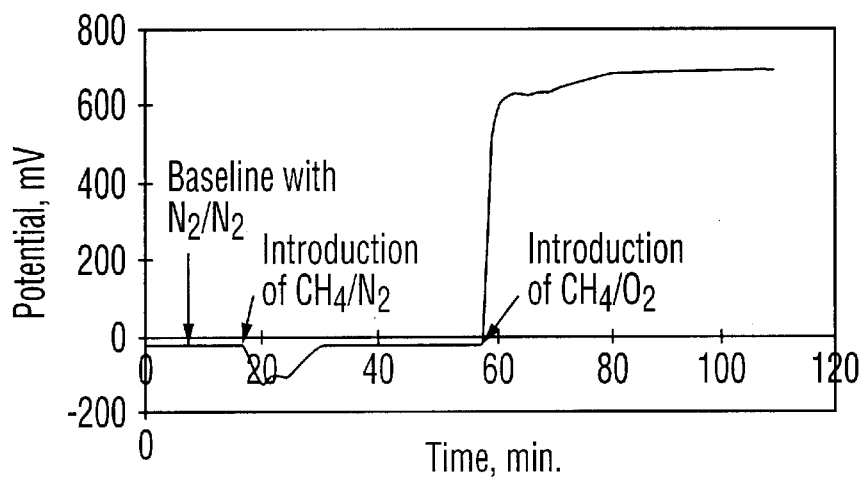
FIG. 6 is a plot of potential v. time for a phosphoric acid treated NAFION™ membrane.

FIG. 6 shows the change of potential with passage of time. As the figure shows, a drastic jump occurred when the gas mode shifted from $CH_4/N_2$ to $CH_4/O_2$. However gas chromatograph analysis of the gas effluent from the anode side did not show the amount of C-2 and higher hydrocarbons corresponding to the measured potential. Trace amounts of ethane or ethylene appeared. It was also noted that the $CO_2$ peak appeared in the effluent throughout the test. The reason for the appearance of $CO_2$ in the effluent is believed to be due to the leakage of air into the system. $CO_2$ which leaked into the system with the air was directly detected by gas chromatography in the effluent. The oxygen in the air may also react with methane on the catalytic electrode, resulting in the production of $CO_2$. A possible explanation for the high potential could be due to the full decomposition of the activated methane. As soon as one hydrogen atom dissociates from the adsorbed methane on the catalyst surface according to the following reaction:

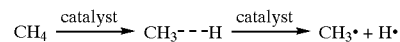

$CH_4 \xrightarrow{catalyst} CH_3\text{-}\text{-}\text{-}H \xrightarrow{catalyst} CH_3\bullet + H\bullet$ the dissociation reaction may continue as follows:

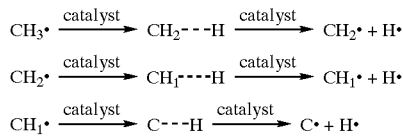

$CH_3\bullet \xrightarrow{catalyst} CH_2\text{-}\text{-}\text{-}H \xrightarrow{catalyst} CH_2\bullet + H\bullet$ $CH_2\bullet \xrightarrow{catalyst} CH_1\text{-}\text{-}\text{-}H \xrightarrow{catalyst} CH_1\bullet + H\bullet$ $CH_1\bullet \xrightarrow{catalyst} C\text{-}\text{-}\text{-}H \xrightarrow{catalyst} C\bullet + H\bullet$ According to this mechanism, carbon should accumulate on the catalytic electrode surface of the anode side instead of forming C-2 and higher hydrocarbons, which would explain why only ppm level of C-2 products were detected in the effluent in some experiments.

EXAMPLE 4

Figure 7:
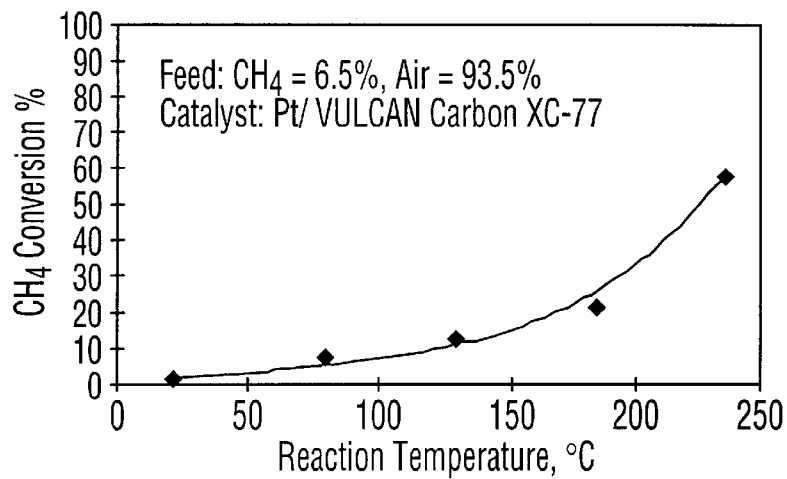
FIG. 7 is a plot of % $CH_4$ conversion v. reaction temperature.

To check the activity of the catalyst used to prepare the catalytic electrode, a tube reactor was set up to conduct the catalytic reaction of methane oxidation. Pt/VULCAN carbon XC-72 was selected for the test. FIG. 7 presents the experimental results. At 180° C., the conversion of methane reached about 25% which indicated that the catalyst did activate the methane. However, considering the preparation procedure of the electrode, the catalyst electrode had to be pressed to contact the membrane. The acidic liquid on the membrane could cover or contaminate the solid catalyst surface directly. Since the catalyst electrode and the membrane must be pressed tightly together to keep a good contact, the phosphoric acid liquid in the membrane was squeezed out and absorbed by the solid catalyst.

EXAMPLE 5 a) Proton Conductivity

Figure 8:
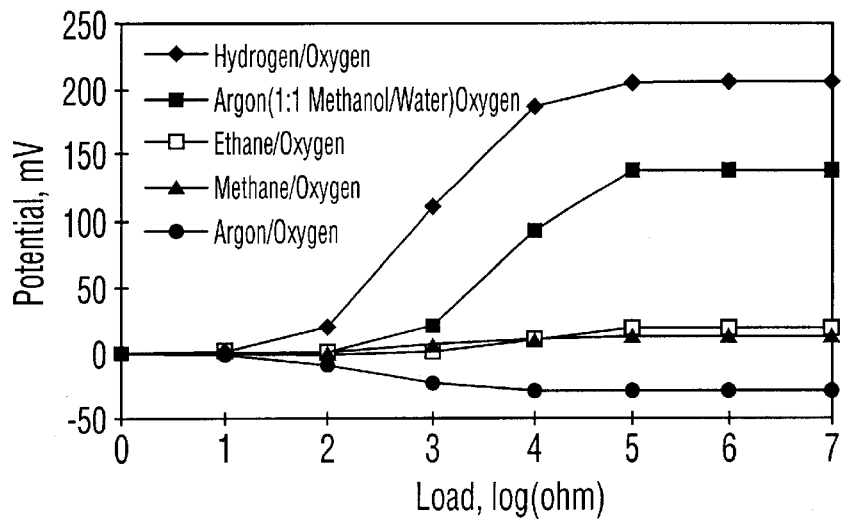
FIG. 8 is a plot of potential v. load on a polybenzimidazole membrane based cell.

It is well known that methane is one of the most stable hydrocarbons. High temperature is required to activate the methane. However, limited by the thermal stability of the NAFION membrane, the reaction temperature was restricted to below 120° C. in this study. The catalyst, as tested, showed a notable activity only after 180° C. Therefore, a protonic membrane operable around and above 200° C. is highly desirable. A PBI membrane has exceptionally high thermal stability (<500° C.). To verify if this membrane has a proton conducting function, testing of a $H_2/O_2$ fuel cell mode was conducted first. Then $CH_3OH/O_2$ and $CH_4/O_2$ modes were tested. FIG. 8 presents the test result at 130° C.

As the result shows, the obtained potential value follows the following order:

$CH_4/O_2 < C_2H_6/O_2 < CH_3OH/O_2 < H_2/O_2$

This order exactly follows the order of the catalyst oxidation activity towards these chemicals. This indicates that the PBI membrane can function for proton conducting while its rate was limited by the catalyst activity towards different chemical compounds.

b) Effect of Gas Electrode Contact Arrangement

Figure 9:
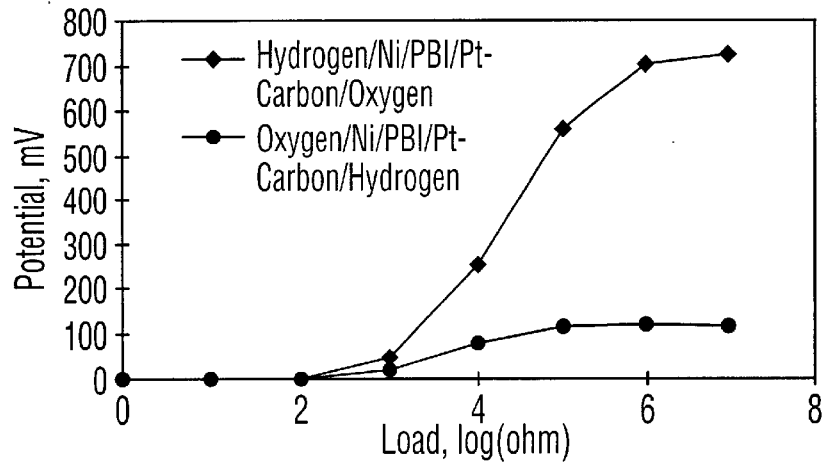
FIG. 9 is a plot of potential v. load for different arrangements of gas-catalytic electrode contact.

The potential obtained from the above test was relatively small as compared to the test result from the phosphoric acid treated NAFION membrane. Tests by loading different catalysts onto the PBI membrane were conducted in a range of temperature up to 225° C. FIG. 9 compares the result by exposing $O_2$ and $H_2$ gases on different gas electrode contact arrangements.

When $O_2$ was on the Pt-carbon side and $H_2$ was on the nickel metal side, the cell produced a potential of 700 mV and higher as compared to 120 mV obtained from the gas-electrode contact in a reverse arrangement, i.e., with $O_2$ on the nickel side, and $H_2$ on the Pt-carbon side. In the first arrangement, $H_2$ was put in contact with the nickel metal. Nickel metal is a well known hydrogenation and dehydrogenation catalyst. Therefore in this case, $H_2$ was activated by nickel metal and $O_2$ was activated by the Pt-carbon catalyst, which arrangement resulted in the production of the high potential. In the second arrangement, $O_2$ was on the nickel metal side. It is well known in the petrochemical industry that nickel metal is not a good oxidation catalyst. It appears that the $O_2$ was not activated in the second arrangement, which resulted in a low potential.

c) Effect of Different Catalytic Electrodes

It was desirable to mix the carbon based catalyst with cellulose for adhesion purposes. However, the prepared cell could not be baked at a high temperature to remove the cellulose in the catalyst because of the presence of phosphoric acid in the cell. The dried carbon on the surface tended to shrink, thereby breaking the PBI membrane which was in a jelly state. The liquid phosphoric acid on the surface may also poison the Pt-carbon catalyst.

Figure 10:
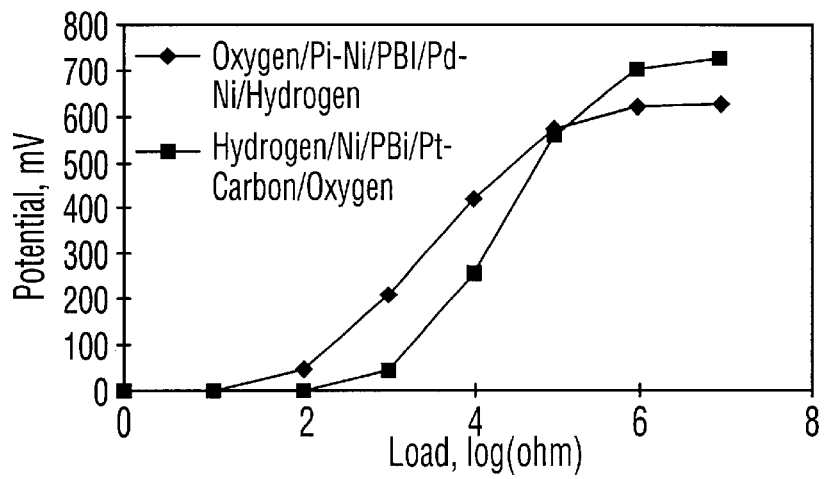
FIG. 10 is a plot of potential v. load showing the effect of catalysts on a polybenzimidazole membrane based cell.

An alternative method was to use nickel mesh loaded with Pt or Pd catalyst. The use of nickel mesh supported metal catalyst greatly facilitated the preparation of the catalytic electrode. The prepared nickel mesh supported catalytic electrode was baked at 300° C. in an oven under a small hydrogen gas stream. In this arrangement the contact between the membrane and the electrode relied on physical contact by a nickel wire. FIG. 10 compares the two types of electrodes from tests using a $H_2/O_2$ fuel cell mode. The carbon based electrode showed a better activity but the difference was not large. The available data indicates that the Pt-carbon catalyst is more active than the Pt-nickel catalyst for $O_2$ activation.

d) Effect of Temperature

Figure 11:
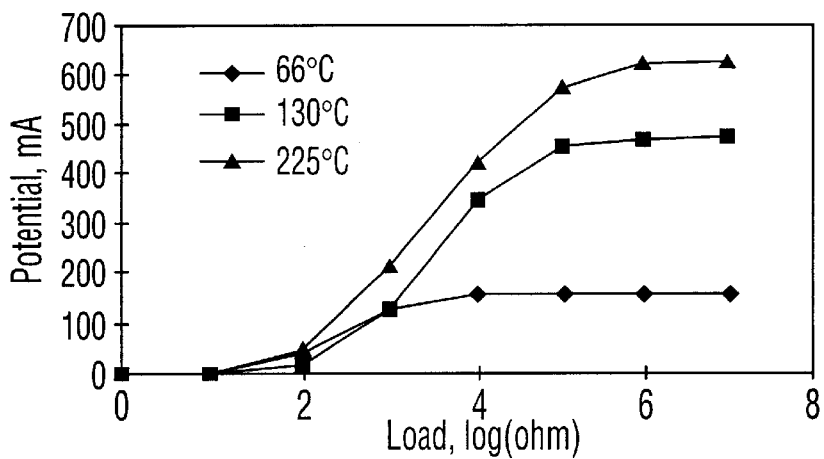
FIG. 11 is a plot of potential v. load showing the effect of temperature on a polybenzimidazole membrane based cell.

FIG. 11 shows HPHT cell testing results at different temperatures for a nickel mesh supported catalytic PBI membrane electrode. As the figure shows, the potential increased with temperature increases. At 225° C., potentials as high as 640 mV were obtained at a resistance load of 10 mega ohm.

Figure 12:
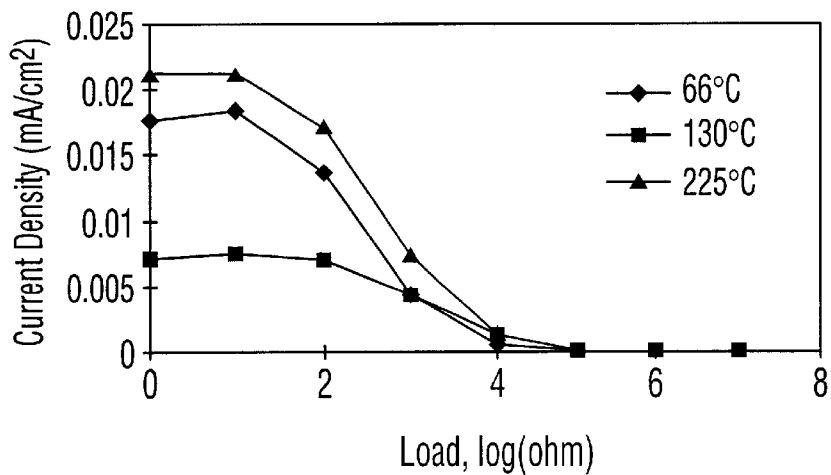
FIG. 12 is a plot of current density at different resistance loads.

For a $H_2/O_2$ fuel cell mode, the thermodynamic equilibrium calculation predicted a maximum theoretical potential of 1230 mV. Considering all types of inevitable potential losses in the electrode interfaces, the potential of 640 mV obtained from the experiment was reasonably high. However the current density converted from a potential-load test shows an amount only in the order of $10^{-3}$ mA/cm$^2$ (FIG. 12).

What is claimed is:

1. A process for gas phase electrocatalytic polymerization of a hydrocarbon selected from the group consisting of methane, ethane and methanol to produce higher hydrocarbons and hydrogen using an electrolysis cell having an anode chamber on one side of a solid electrolyte and a cathode chamber on the other side of the solid electrolyte, said process comprising:

passing a gas containing said hydrocarbon through said anode chamber to contact a catalytic anode which is connected to said one side of the solid electrolyte, said solid electrolyte comprising a solid proton conducting membrane formed of perfluorosulfonic acid or polybenzimidazole, passing an inert gas or oxygen through said cathode chamber to contact a catalytic cathode which is connected to said other side of the proton conducting membrane, passing H$^+$ through the membrane from the anode chamber to the cathode chamber, and maintaining the electrolysis cell at a temperature below 300° C., thereby forming said higher hydrocarbons in the anode chamber and forming said hydrogen or water in the cathode chamber.

2. A process according to claim 1 wherein the hydrocarbon-containing gas is a methane-containing gas.

3. A process according to claim 2 wherein the cell temperature is in the range of about 60 to 300° C.

4. A process according to claim 3 wherein the membrane is perfluorosulfonic acid polymer treated with phosphoric acid and the cell temperature is in the range of about 60 to 210° C.

5. A process according to claim 4 wherein the cell temperature is in the range of about 180 to 210° C.

6. A process according to claim 3 wherein the membrane is polybenzimidazole.

7. A process according to claim 6 wherein the cell temperature is in the range of about 130 to 225° C.

8. A process according to claim 7 wherein the cell temperature is in the range of about 180 to 225° C.

9. A process according to claim 2 wherein the cell temperature is in the range of about 65 to 225° C.

10. A process according to claim 1 wherein the catalytic anode and cathode are formed of compressed carbon powder loaded with metal catalyst.

11. A process according to claim 1 wherein the anode and cathode are formed of carbon cloth supporting metal catalyst.

12. A process according to claim 1 wherein the anode and cathode are formed of nickel mesh impregnated with metal catalyst.

* * * * *